(12) United States Patent
Hawes

(10) Patent No.: US 7,306,703 B2
(45) Date of Patent: Dec. 11, 2007

(54) CONTAMINATION RESISTANT PRESS FABRIC STRUCTURE AND METHOD OF MANUFACTURE

(75) Inventor: John M. Hawes, Averill Park, NY (US)

(73) Assignee: Albany International Corp., Albany, NY (US)

(*) Notice: Subject to any disclaimer, the term of this patent is extended or adjusted under 35 U.S.C. 154(b) by 542 days.

(21) Appl. No.: 10/444,375

(22) Filed: May 23, 2003

(65) Prior Publication Data

US 2004/0234718 A1    Nov. 25, 2004

(51) Int. Cl.
*D21F 7/08* (2006.01)
*B32B 5/26* (2006.01)
*B32B 27/12* (2006.01)

(52) U.S. Cl. .................. 162/358.2; 162/199; 162/900; 28/110; 427/244; 442/94; 442/270; 442/275

(58) Field of Classification Search .......... 162/117, 162/199, 348, 358.1, 358.2, 900, 902, 903, 162/904; 28/110, 142; 428/57, 193; 442/93–95, 442/270–275, 381–383, 387, 388, 397, 402; 34/95, 116, 123; 427/176, 179, 243, 244

See application file for complete search history.

(56) References Cited

U.S. PATENT DOCUMENTS

| | | | | |
|---|---|---|---|---|
| 3,613,258 A | * | 10/1971 | Jamieson | ........................ 34/95 |
| 4,151,323 A | | 4/1979 | Christie | |
| 4,162,190 A | * | 7/1979 | Ashworth | ................. 162/358.2 |
| 4,439,481 A | * | 3/1984 | Johnson et al. | ............. 442/271 |
| 4,500,588 A | | 2/1985 | Lundstrom | |
| 4,529,643 A | | 7/1985 | Lundstrom | |
| 4,855,162 A | | 8/1989 | Wrasidlo et al. | |
| 5,141,800 A | | 8/1992 | Effenberger et al. | |
| 5,207,873 A | * | 5/1993 | Sanduja et al. | ........... 162/358.2 |
| 5,328,757 A | * | 7/1994 | Kenney et al. | ............. 442/268 |
| 5,346,567 A | | 9/1994 | Barnewall | |
| 5,360,656 A | | 11/1994 | Rexfelt et al. | |
| 5,372,876 A | | 12/1994 | Johnson et al. | |
| 5,395,868 A | | 3/1995 | Sanduja et al. | |
| 5,508,095 A | | 4/1996 | Allum et al. | |
| 5,591,305 A | * | 1/1997 | Cameron | ..................... 162/117 |
| 5,714,082 A | | 2/1998 | Boardman et al. | |
| 5,942,322 A | * | 8/1999 | Ensign et al. | ............. 428/315.5 |
| 6,140,260 A | * | 10/2000 | Johnson et al. | .............. 442/270 |
| 6,162,369 A | | 12/2000 | Allewaert et al. | |
| 6,284,380 B1 | * | 9/2001 | Martin et al. | ................ 428/422 |
| 6,344,243 B1 | | 2/2002 | McClain et al. | |
| 6,372,870 B1 | | 4/2002 | Kitahara et al. | |
| 6,538,084 B2 | | 3/2003 | Kitahara et al. | |
| 6,648,147 B1 | * | 11/2003 | Lydon et al. | ................ 210/490 |
| 6,712,940 B2 | * | 3/2004 | Crook | ......................... 162/306 |
| 2002/0104631 A1 | | 8/2002 | Hansen et al. | |

FOREIGN PATENT DOCUMENTS

| | | | |
|---|---|---|---|
| EP | 0 547 816 A | | 6/1993 |
| EP | 0 653 512 | | 5/1995 |
| GB | 2332916 | * | 7/1999 |

OTHER PUBLICATIONS

U.S. Appl. No. 08/908,556, filed Aug. 8, 1997.

* cited by examiner

*Primary Examiner*—Eric Hug
(74) *Attorney, Agent, or Firm*—Frommer Lawrence & Haug LLP; Ronald R. Santucci

(57) ABSTRACT

The present invention is directed to fabrics for paper making machines that are rendered contamination resistant and maintain good permeability as a result of a durable coating that lasts the entire life of the fabric. A fluoropolymer will render the fabric contamination resistant over the entire fabric lifetime.

26 Claims, No Drawings

CONTAMINATION RESISTANT PRESS FABRIC STRUCTURE AND METHOD OF MANUFACTURE

BACKGROUND OF THE INVENTION

1. Field of the Invention

The present invention relates to the papermaking arts. More specifically, the present invention relates to press fabrics for the press section of a paper machine that are resistant to contamination.

2. Description of the Prior Art

During the papermaking process, a cellulosic fibrous web is formed by depositing a fibrous slurry, that is, an aqueous dispersion of cellulose fibers, onto a moving forming fabric in the forming section of a paper machine. A large amount of water is drained from the slurry through the forming fabric, leaving the cellulosic fibrous web on the surface of the forming fabric.

The newly formed cellulosic fibrous web proceeds from the forming section to a press section, which includes a series of press nips. The cellulosic fibrous web passes through the press nips supported by a press fabric, or, as is often the case, between two such press fabrics. In the press nips, the cellulosic fibrous web is subjected to compressive forces which squeeze water therefrom, and which adhere the cellulosic fibers in the web to one another to turn the cellulosic fibrous web into a paper sheet. The water is accepted by the press fabric or fabrics and, ideally, does not return to the paper sheet.

The paper sheet finally proceeds to a dryer section, which includes at least one series of rotatable dryer drums or cylinders, which are internally heated by steam. The newly formed paper sheet is directed in a serpentine path sequentially around each in the series of drums by a dryer fabric, which holds the paper sheet closely against the surfaces of the drums. The heated drums reduce the water content of the paper sheet to a desirable level through evaporation.

It should be appreciated that the forming, press and dryer fabrics all take the form of endless loops on the paper machine and function in the manner of conveyors. It should further be appreciated that paper manufacture is a continuous process which proceeds at considerable speeds. That is to say, the fibrous slurry is continuously deposited onto the forming fabric in the forming section, while a newly manufactured paper sheet is continuously wound onto rolls after it exits from the dryer section.

The present invention relates specifically to the press fabrics used in the press section. Press fabrics play a critical role during the paper manufacturing process. One of their functions, as implied above, is to support and to carry the paper product being manufactured through the press nips.

Press fabrics also participate in the finishing of the surface of the paper sheet. That is, press fabrics are designed to have smooth surfaces and uniformly resilient structures, so that, in the course of passing through the press nips, a smooth, mark-free surface is imparted to the paper.

Perhaps most importantly, the press fabrics accept the large quantities of water extracted from the wet paper in the press nip. In order to fill this function, there literally must be space, commonly referred to as void volume, within the press fabric for the water to go, and the fabric must have adequate permeability to water for its entire useful life. Finally, press fabrics must be able to prevent the water accepted from the wet paper from returning to and rewetting the paper upon exit from the press nip.

Contemporary press fabrics are produced in a wide variety of styles designed to meet the requirements of the paper machines on which they are installed for the paper grades being manufactured. Generally, they comprise a woven base fabric into which has been needled a batt of fine, non-woven fibrous material. The base fabrics may be woven from monofilament, plied monofilament, multifilament or plied multifilament yarns, and may be single-layered, multi-layered or laminated. The yarns are typically extruded from any one of several synthetic polymeric resins, such as polyamide and polyester resins, used for this purpose by those of ordinary skill in the paper machine clothing arts.

The woven base fabrics themselves take many different forms. For example, they may be woven endless, or flat woven and subsequently rendered into endless form with a woven seam. Alternatively, they may be produced by a process commonly known as modified endless weaving, wherein the widthwise edges of the base fabric are provided with seaming loops using the machine-direction (MD) yarns thereof. In this process, the MD yarns weave continuously back and forth between the widthwise edges of the fabric, at each edge turning back and forming a seaming loop. A base fabric produced in this fashion is placed into endless form during installation on a paper machine, and for this reason is referred to as an on- machine-seamable fabric. To place such a fabric into endless form, the two widthwise edges are brought together, the seaming loops at the two edges are interdigitated with one another, and a seaming pin or pintle is directed through the passage formed by the interdigitated seaming loops.

Further, the woven base fabrics may be laminated by placing one base fabric within the endless loop formed by another, and by needling a staple fiber batt through both base fabrics to join them to one another. One or both woven base fabrics may be of the on- machine-seamable type.

In any event, the woven base fabrics are in the form of endless loops, or are seamable into such forms, having a specific length, measured longitudinally therearound, and a specific width, measured transversely there across. Because paper machine configurations vary widely, paper machine clothing manufacturers are required to produce press fabrics, and other paper machine clothing, to the dimensions required to fit particular positions in the paper machines of their customers. Needless to say, this requirement makes it difficult to streamline the manufacturing process, as each press fabric must typically be made to order.

In response to this need to produce press fabrics in a variety of lengths and widths more quickly and efficiently, press fabrics have been produced in recent years using a spiral technique disclosed in commonly assigned U.S. Pat. No. 5,360,656 to Rexfelt et al., the teachings of which are incorporated herein by reference.

U.S. Pat. No. 5,360,656 shows a press fabric comprising a base fabric having one or more layers of staple fiber material needled thereinto. The base fabric comprises at least one layer composed of a spirally wound strip of woven fabric having a width which is smaller than the width of the base fabric. The base fabric is endless in the longitudinal, or machine, direction. Lengthwise threads of the spirally wound strip make an angle with the longitudinal direction of the press fabric. The strip of woven fabric may be flat-woven on a loom which is narrower than those typically used in the production of paper machine clothing.

The base fabric comprises a plurality of spirally wound and joined turns of the relatively narrow woven fabric strip. The fabric strip is woven from lengthwise (warp) and crosswise (filling) yarns. Adjacent turns of the spirally wound fabric strip may be abutted against one another, and the helically continuous seam so produced may be closed by sewing, stitching, melting, welding (e.g. ultrasonic) or gluing. Alternatively, adjacent longitudinal edge portions of adjoining spiral turns may be arranged overlappingly, so long as the edges have a reduced thickness, so as not to give rise to an increased thickness in the area of the overlap. Further, the spacing between lengthwise yarns may be increased at the edges of the strip, so that, when adjoining spiral turns are arranged overlappingly, there may be an unchanged spacing between lengthwise threads in the area of the overlap.

In any case, a woven base fabric, taking the form of an endless loop and having an inner surface, a longitudinal (machine) direction and a transverse (crossmachine) direction, is the result. The lateral edges of the woven base fabric are then trimmed to render them parallel to its longitudinal (machine) direction. The angle between the machine direction of the woven base fabric and the helically continuous seam may be relatively small, that is, typically less than 10°. By the same token, the lengthwise (warp) yarns of the woven fabric strip make the same relatively small angle with the longitudinal (machine) direction of the woven base fabric. Similarly, the crosswise (filling) yarns of the woven fabric strip, being perpendicular to the lengthwise (warp) yarns, make the same relatively small angle with the transverse (cross-machine) direction of the woven base fabric. In short, neither the lengthwise (warp) nor the crosswise (filling) yarns of the woven fabric strip align with the longitudinal (machine) or transverse (cross-machine) directions of the woven base fabric.

In the method shown in U.S. Pat. No. 5,360,656, the woven fabric strip is wound around two parallel rolls to assemble the woven base fabric. It will be recognized that endless base fabrics in a variety of lengths and widths may be provided by spirally winding a relatively narrow piece of woven fabric strip around the two parallel rolls, the length of a particular endless base fabric being determined by the length of each spiral turn of the woven fabric strip, and the width being determined by the number of spiral turns of the woven fabric strip. The prior necessity of weaving complete base fabrics of specified lengths and widths to order may thereby be avoided. Instead, a loom as narrow as 20 inches (0.5 meters) could be used to produce a woven fabric strip, but, for reasons of practicality, a conventional textile loom having a width of from 40 to 60 inches (1.0 to 1.5 meters) may be preferred.

U.S. Pat. No. 5,360,656 also shows a press fabric comprising a base fabric having two layers, each composed of a spirally wound strip of woven fabric. Both layers take the form of an endless loop, one being inside the endless loop formed by the other. Preferably, the spirally wound strip of woven fabric in one layer spirals in a direction opposite to that of the strip of woven fabric in the other layer. That is to say, more specifically, the spirally wound strip in one layer defines a right-handed spiral, while that in the other layer defines a left-handed spiral. In such a two-layer, laminated base fabric, the lengthwise (warp) yarns of the woven fabric strip in each of the two layers make relatively small angles with the longitudinal (machine) direction of the woven base fabric, and the lengthwise (warp) yarns of the woven fabric strip in one layer make an angle with the lengthwise (warp) yarns of the woven fabric strip in the other layer. Similarly, the crosswise (filling) yarns of the woven fabric strip in each of the two layers make relatively small angles with the transverse (cross-machine) direction of the woven base fabric, and the crosswise (filling) yarns of the woven fabric strip in one layer make an angle with the crosswise (filling) yarns of the woven fabric strip in the other layer. In short, neither the lengthwise (warp) nor the crosswise (filling) yarns of the woven fabric strip in either layer align with the longitudinal (machine) or transverse (cross-machine) directions of the base fabric. Further, neither the lengthwise (warp) nor the crosswise (filling) yarns of the woven fabric strip in either layer align with those of the other.

As a consequence, the base fabrics shown in U.S. Pat. No. 5,360,656 have no defined machine- or cross-machine-direction yarns. Instead, the yarn systems lie in directions at oblique angles to the machine and cross-machine directions. A press fabric having such a base fabric may be referred to as a multiaxial press fabric. Whereas the standard press fabrics of the prior art have three axes: one in the machine direction (MD), one in the cross-machine direction (CD), and one in the z-direction, which is through the thickness of the fabric, a multiaxial press fabric has not only these three axes, but also has at least two more axes defined by the directions of the yarn systems in its spirally wound layer or layers. Moreover, there are multiple flow paths in the z-direction of a multiaxial press fabric. As a consequence, a multiaxial press fabric has at least five axes. Because of its multiaxial structure, a multiaxial press fabric having more than one layer exhibits superior resistance to nesting and/or to collapse in response to compression in a press nip during the papermaking process as compared to one having base fabric layers whose yarn systems are parallel to one another.

Regardless of the application or the manner in which the formed, fabrics must exhibit characteristics specific to the dewatering function, such as (1) receiving the large amount of water pressed from the paper furnish in the press nip, (2) releasing water to a vented press roll on the opposite or non sheetside of the press fabric, (3) releasing water to an auxiliary suction dewatering apparatus, and (4) remaining permeable so that both water and air can flow into and through the fabric.

The degree of openness of a fabric is continually reduced during its lifetime. In addition to the fiber slurry, paper pulp ordinarily contains additives such as filler clay, pitch, and polymeric materials that clog the open spaces of the fabric. The use of recycled fibers has introduced considerable amounts of contaminants in the form of inks, adhesives, tars, and polymeric materials, which also clog the open spaces of the fabric. In addition, fabrics are sometimes constructed of multiple layers that are more susceptible to contamination problems.

Accordingly, fabrics that exhibit an improved degree of contamination resistance are desirable. One proposed prior art solution is the use of contamination resistant yarns in the construction of the fabric. This has not proved to be wholly satisfactory since the contamination resistance provided by such yarns is short-lived and/or ineffective. Another proposed solution calls for coating or treating papermaking fabrics in order to improve resistance to contaminants. Again, this method is not wholly successful because the contamination resistance provided by the coating is short-lived and/or ineffective.

One problem generally inherent to coatings or treatments is that coatings per se are known to reduce the permeability of a fabric, an undesired result that inhibits water removal capabilities, the primary function of a press fabric. It is therefore important that any coating applied to a press fabric reduce permeability as little as possible.

U.S. Pat. Nos. 5,207,873 and 5,395,868 describe papermaking fabrics claimed to have permanent resistance to adhesion of contaminants. The fabrics are coated with solutions having as their primary components tetrafluoroethylene, urethane copolymer and polyacrylamide.

However, one of the difficulties in applying or using such coatings is positioning the coating in the structure such that they perform their function in an optimized fashion. For example, if a coating is dispersed throughout the cross-section of a monofilament, one finds that the coating which is contained within the body of the monofilament does not provide any useful anti-soiling function. Coatings which reside at the surface of the as-produced monofilament or at an abraided surface are found to provide good anti-soiling function while coatings contained in the interior of a monofilament may provide function when they are exposed through abrasion. A significant portion of the coating contained within the monofilament never sees practical use as it never becomes exposed to the surface during fabric wear. In addition to this non-optimal use of coatings, the high cost of coatings relative to the base materials typically used to produce monofilaments for paper machine clothing and related applications contributes to high product cost relative to product performance or benefit.

The present invention is directed to a contamination resistant press fabric and a method for forming such a press fabric that overcomes the shortcomings of the prior art.

SUMMARY OF THE INVENTION

It is an object of the present invention to provide a press fabric used in the pressing section of a paper making machine that exhibits an improved resistance to contamination over the entire life of the fabric.

It is a further object of the invention to provide a fabric coated in manner that optimizes the benefits realized by the coating, while minimizing the amount of coating applied.

It is a further object of the invention to provide a coating which does not significantly affect the permeability of the fabric.

It is a further object of the present invention to provide a coating for a fabric used in a papermaking machine that achieves the aforementioned objectives.

The present invention is a coated fabric used in a papermaking machine that has an enhanced resistance to contamination which lasts over the entire fabric lifetime.

The present invention is a coated press fabric comprised of a base layer; at least one layer of fibrous batt that is attached to the base layer; a fluoropolymer coating that is applied to the fibrous batt and base layer. An additional layer of fibrous batt may be applied to the coated fabric.

In another embodiment of the present invention, an intermediate press fabric structure comprises:

a narrow strip of base fabric structure that is less wide than the press fabric in its finished state;

at least one layer of fibrous batt attached to the strip of base fabric structure; and a fluoropolymer layer applied to the fibrous batt and base layer.

By practicing the construction techniques taught by U.S. Pat. No. 5,360,656, the strips of the intermediate press fabric structure can be placed side by side, with the edges of the strips being joined together. Preferably, the strips have a width of 0.5 m-1.5 m. The number of strips layed side by side depends on the desired width of the finished press fabric. Once the structure has been formed at its desired width, additional layers of fibrous batt are applied to fabric and attached thereto, such as by needling, adhesive bonding, or the techniques known in the art.

It should be understood that very long lengths of the strips narrow strips of can be formed and placed onto feeder rolls. By feeding out the strips from the rolls, and wrapping the strips in a side-by-side arrangement around parallel axes set at preselected distance from each other, it is possible to produce a press fabric having the desired final dimensions.

By applying the fluoropolymer to the strips of press fabric structure, the present invention avoids any problems that may be associated with limited pot-life of the coating and any disposed problems of the unused resin. The coating width has been significantly reduced, which reduces the dimensions of the coating apparatus. As a result of these modifications, an improved degree of control the coating process is realized.

Suitable fluropolymers include polytetrafluoroethylene (PTFE), polyvinylideneflouride (PVDF), polyethylene chlorotrifluoroethylene (PECTFE), and others sold under the trade name Teflon® (DuPont).

It has been observed that a large portion of polymeric contaminants that reduce void volume, and hence water removal, are concentrated in the base structure. It is generally believed that in operation on a paper machine, the cleanliness of the outer batt layer of the press fabric is maintained by the mechanical energy provided by high pressure cleaning showers, which energy dissipates rapidly through the thickness of the fabric. At the base structure uppermost surface, which is really an interfacial region between two fabric components of different specific surface (base yarns and staple fibers for example), is subject to substantially less mechanical energy from the showers than the upper fabric regions are subjected to. Thus, cohesive forces which cause the agglomeration of the various gels and chemical species, and adhesive forces that attach them to the fabric, are not disrupted sufficiently in the lower fabric regions to prevent their formation. It is believed that this phenomena has not been accounted for by prior art attempts at improving contamination resistance. It is also believed that by positioning the fluoropolymer on or near the base layer, the press fabric will possess an excellent degree of contamination resistance at the place where it is needed most.

The various features of novelty which characterize the invention are pointed out in particularity in the claims annexed to and forming a part of this disclosure. For a better understanding of the invention, its operating advantages and specific objects attained by its uses, reference is made to the accompanying descriptive matter in which preferred embodiments of the invention are illustrated.

DETAILED DESCRIPTION OF THE PREFERRED EMBODIMENTS

In a first embodiment of the present invention, a full width base fabric structure or layer that has been produced by conventional techniques such as weaving, knitting, spiral winding of yarn arrays or apertured polymeric films, is needled with a portion of the total batt component using conventional needling equipment. By portion, it is meant that an initial layer or layers of batt are applied to the base structure. Base structure or layer constructions used herein include woven, and nonwovens such as knitted, extruded mesh, spiral-link, MD or CD yarn arrays, and spiral wound strips of woven and nonwoven materials. These substrates may include yarns of monofilament, plied monofilament, multifilament or plied multifilament, and may be single-layered, multi-layered or laminated. The yarns are typically extruded from any one of the synthetic polymeric resins, such as polyamide and polyester resins, used for this purpose by those of ordinary skill in the industrial fabric arts.

The structure need not be endless, and indeed is preferable if it is on-machine-seamable (OMS®) and can be rolled up after partial needling for later processing. After this partial needling is complete, the fluoropolymer anti-contaminant coating is applied to the structure by either the conventional kiss roll/vacuum roll/vacuum slot method, or by metered spray.

Suitable fluoropolymers include polytetrafluoroethylene (PTFE), polyvinylidenefluoride (PVDF), polyethylene chlorotrifluoroethylene (PECTFE), and others sold under the trade name Teflon® (DuPont).

After the application of the anti-contaminant coating, hot air can be used to speed the drying if necessary. This provides an intermediate press fabric structure that has anti-contaminant properties located in the base structure and/or initial layer or layers of fibrous batt. The structure of the press fabric is then completed by needling at least one additional layer of fibrous batt, and conducting other process steps, such as seam opening, washing, drying and final dimensional sizing.

By producing a press fabric wherein the coating is applied to the initial layers of fibrous batt that have been needled to the base, the coating is in position to be most effective in reducing fabric contamination.

The fabric coating formulation may contain 5% to about 50% solids on a weight-weight basis, with a mass add-on of 0.1% to 10.0% based on the weight of the uncoated fabric. The % mass add on is:

100×(basis weight of a dry, coated fabric−basis weight of a dry uncoated fabric)

Basis Weight of a Dry Uncoated Fabric

As a general matter, a greater degree of the original permeability of a coated fabric is retained when the solids content of the coating or mass add on of the coating is reduced. Water, a preferred diluent for aqueous based coatings, may be used to reduce solids content and consequently percent mass add on. It has been found that fabrics having coating formulations of a solids content in the range of 10% to 15% (w/w) or a mass add on of 1% to 3% maintain a high degree of their original permeability. That is, they maintain about 90% -99% of their original permeability, which is preferred. In other words, permeability is reduced only about 1% -10% as a result of the coating. Typically, the coating my be applied to the fabrics via a kiss roll applicator followed by a vacuum slot, but the fabrics may be coated in any conventional manner, including immersion within a coating bath, blade or bar coating techniques, squeegee coating, spray application, slot applicator, and brush applicator. Application with a kiss roll has been effective. The coating can be applied in a single pass, or it may be applied in multiple passes. Subsequent processing may require removing excess material and then drying or curing the coating as directed by the manufacturer of that particular material.

In another embodiment of the invention, a strip of narrow base fabric structure (i.e. a structure that is less than the width of the final fabric that would be used on the papermachine) may be prepared by weaving, knitting, spiral winding of yarns or by apertured polymeric films providing a base structure as aforenoted. The term "strip" as used herein and in the following relates to a piece of material having an essentially larger length than width, the only upper limit of the strip width is that it should be narrower than the width of the final base fabric. For example the strip width may be 0.5-1.5 m, whereas the finished press fabric may be 10 m or wider. A portion of the total batt (as set forth above) is attached to the narrow strip of base fabric by needling using conventional needling equipment. After this partial needling is complete, the anti-containment coating is then applied to the structure by either the conventional kiss roll/vacuum roll/vacuum slot method, or by metered spraying. After the application of the anti-contaminant coating, hot air can be used to speed the drying if necessary. After coating, the narrow base substrate can be rolled up after coating to await later processing. In essence, what has been produced is a partial press fabric structure that has anti-contaminant properties in the base structure and/or the initial layer or layers of fibrous batt. The partial press fabric structure can be used to make a full width press fabric according to the teachings of U.S. Pat. No. 5,360,656.

By applying the anti-contaminant coating to the base structure in it "narrow" phase, and knowing the coating uptake of the base structure and the length of the feedstock, precise consumption of the coating can be achieved. This will eliminate the potlife and disposal problems seen with full width coating application, as well as placing the coating in the most effective position within the fabric. Other advantages are a reduction in the total amount of coating necessary to be effective and consequently a minimal negative effect on fabric permeability and dewatering capability.

Thus the present invention its objects and advantages are realized, and although preferred embodiments have been disclosed and described in detail herein, its scope and objects should not be limited thereby; rather its scope should be determined by that of the appended claims.

I claim:

1. A papermaker's press fabric comprised of:
 a base structure;
 a first layer of fibrous batt attached to the base structure;
 at least one layer of coating of a fluoropolymer applied to the first layer of the fibrous batt; and
 a second layer of fibrous batt applied over the first layer of fibrous batt and attached to the base structure;
 whereby the applied fluoropolymer layer aids cleanability and contamination resistance of the press fabric.

2. The fabric as set forth in claim 1 wherein the mass add-on of the applied fluoropolymer layer, when dry, is 0.1% to 10.0% based on the mass of the fabric.

3. The fabric as set forth in claim 1 wherein the mass add-on of the applied fluoropolymer layer when dry is 1.0% to 3.0% based on mass of the fabric.

4. The fabric as. set forth in claim 1 wherein the fluoropolymer is PTFE.

5. The fabric of claim 1 wherein the fluoropolymer is PVDF.

6. The fabric of claim 1 wherein the fluoropolymer is PCTFE.

7. The fabric as set forth in claim 1 wherein the layers of fibrous batt are needled to the base structure.

8. The fabric as set forth in claim 1 wherein the fluoropolymer is applied by spraying.

9. The fabric as set forth in claim 1 wherein the fluoropolymer is applied by kiss roll applicator.

10. The fabric as set forth in claim 1 wherein a fibrous batt is applied to both sides of the base structure.

11. The fabric as set forth in claim 1, wherein the base structure is taken from the group consisting essentially of woven, or nonwoven, such as spiral-link, MD or CD yarn arrays, knitted, extruded mesh, or material strips which are ultimately spiral wound to form a substrate having a width greater than a width of the strips.

12. The fabric as set forth in claim 11 wherein a fibrous batt is applied to both sides of the base structure.

13. The fabric as set forth in claim 11 wherein the base structure is taken from the group consisting essentially of woven, or nonwoven, such as spiral-link, MD or CD yarn arrays, knitted or extruded mesh.

14. An intermediate press fabric structure for constructing a finished press fabric comprising:
   a strip of base structure having a width that is less than the width of a finished press fabric;
   at least one layer of fibrous batt attached to the strip of base structure;
   a fluoropolymer layer applied to fibrous batt and the base structure.

15. The intermediate press fabric structure of claim 14 wherein the intermediate base structure has a length dimension that is greater than the length of the finished press fabric.

16. The intermediate press fabric structure of claim 15 wherein the intermediate press fabric structure is stored on a roll.

17. The intermediate press fabric structure of claim 15 wherein the press fabric is constructed of a unitary piece of intermediate base structure that is wound around two parallel rolls set apart from each other at a preselected distance, and wherein the turns of intermediate press fabric structure are positioned around said rolls in a side by side arrangement and said edges of the turns are attached to each other.

18. A press fabric constructed of the intermediate press fabric structure of claim 14 wherein the press fabric is comprised of:
   a plurality of intermediate strips of base structures in a side by side arrangement, said intermediate press fabric strips being attached to each other at their edges to provide a press fabric structure; and at least one additional layer of fibrous ban attached to the press fabric structure.

19. A method of forming a papermaker's press fabric comprising the steps of:
   providing a base structure;
   needling a first layer of staple fibers into the base structure;
   coating the needled base structure with a fluoropolymer; and
   needling a second layer of staple fibers over the first layer of staple fibers attached to the base structure.

20. The method of claim 19, wherein the fluoropolymer is PTFE.

21. The method of claim 19, wherein the fluoropolymer is PVDF.

22. The method of claim 19, wherein the fluoropolymer is PECTFE.

23. The method of claim 19, wherein the fluoropolymer is applied by spraying.

24. The method of claim 19, wherein the fluoropolymer is applied by kiss roll applicator.

25. The method of claim 19 wherein a layer of staple fibers is needled into both sides of the base structure.

26. The method of claim 19 wherein the base structure is taken from the group consisting essentially of woven, or nonwoven, such as spiral-link, MD or CD yarn arrays, knitted, extruded mesh, or material strips which are ultimately spiral wound to form a substrate having a width greater than a width of the strips.

* * * * *